United States Patent
Hancock et al.

(10) Patent No.: US 6,195,391 B1
(45) Date of Patent: Feb. 27, 2001

(54) HYBRID VIDEO COMPRESSION/ DECOMPRESSION SYSTEM

(75) Inventors: Steven Marshall Hancock; Mark Andrew Pietras; Leslie R. Wilson, all of Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/251,730

(22) Filed: May 31, 1994

(51) Int. Cl.[7] .................................................. H04N 7/18
(52) U.S. Cl. ...................... 375/240.24; 375/240; 348/420
(58) Field of Search ........................... 348/416, 420, 348/699, 400, 394; 375/240.24

(56) References Cited

U.S. PATENT DOCUMENTS

| | | | |
|---|---|---|---|
| 4,743,959 | * 5/1988 | Frederiksen | 348/420 |
| 4,797,729 | * 1/1989 | Tsai | 348/420 |
| 5,046,119 | * 9/1991 | Hoffert et al. | 348/420 |
| 5,343,539 | * 8/1994 | Chan | 348/420 |
| 5,392,072 | * 2/1995 | Rodriguez et al. | 348/416 |
| 5,408,542 | * 4/1995 | Callahan | 348/420 |
| 5,463,701 | * 10/1995 | Kantner, Jr. et al. | 348/420 |
| 5,465,118 | * 11/1995 | Hancock et al. | 348/420 |
| 5,471,248 | * 11/1995 | Bhargava et al. | 348/420 |

* cited by examiner

Primary Examiner—Andy Rao
(74) Attorney, Agent, or Firm—Jeffrey S. LaBaw; Felsman, Bradley, Vaden, Gunter & Dillon, LLP

(57) ABSTRACT

A digitized image compression system employs several different compression techniques to compress the luminance and chrominance information and encodes the selected technique "on the fly" by inserting selected escape and header codes into the encoded data stream. More particularly, during compression, each image is divided into non-overlapping contiguous regions, referred to hereinafter as blocks and image data is compressed on a block-by-block basis. Each encoded block begins with a one-byte header that indicates, in conjunction with a previous escape code, the compression technique which was used to encode the block. Therefore, interpretation of the encoded data is a hierarchical process: the escape codes indicate a stream interpretation mode which, in turn, determine the meaning of header values which follow and the header values, in turn, determine the meaning of the encoded data in each block. The majority of image blocks are divided into quadrants and each block header is arranged as a sequence of four two-bit codes which indicate the encoding used for the four quadrants within the associated block. However, certain combinations of encoding that are unlikely to occur within the same block are inserted into the image data stream as the "escape codes" which designate the stream interpretation mode.

33 Claims, 9 Drawing Sheets

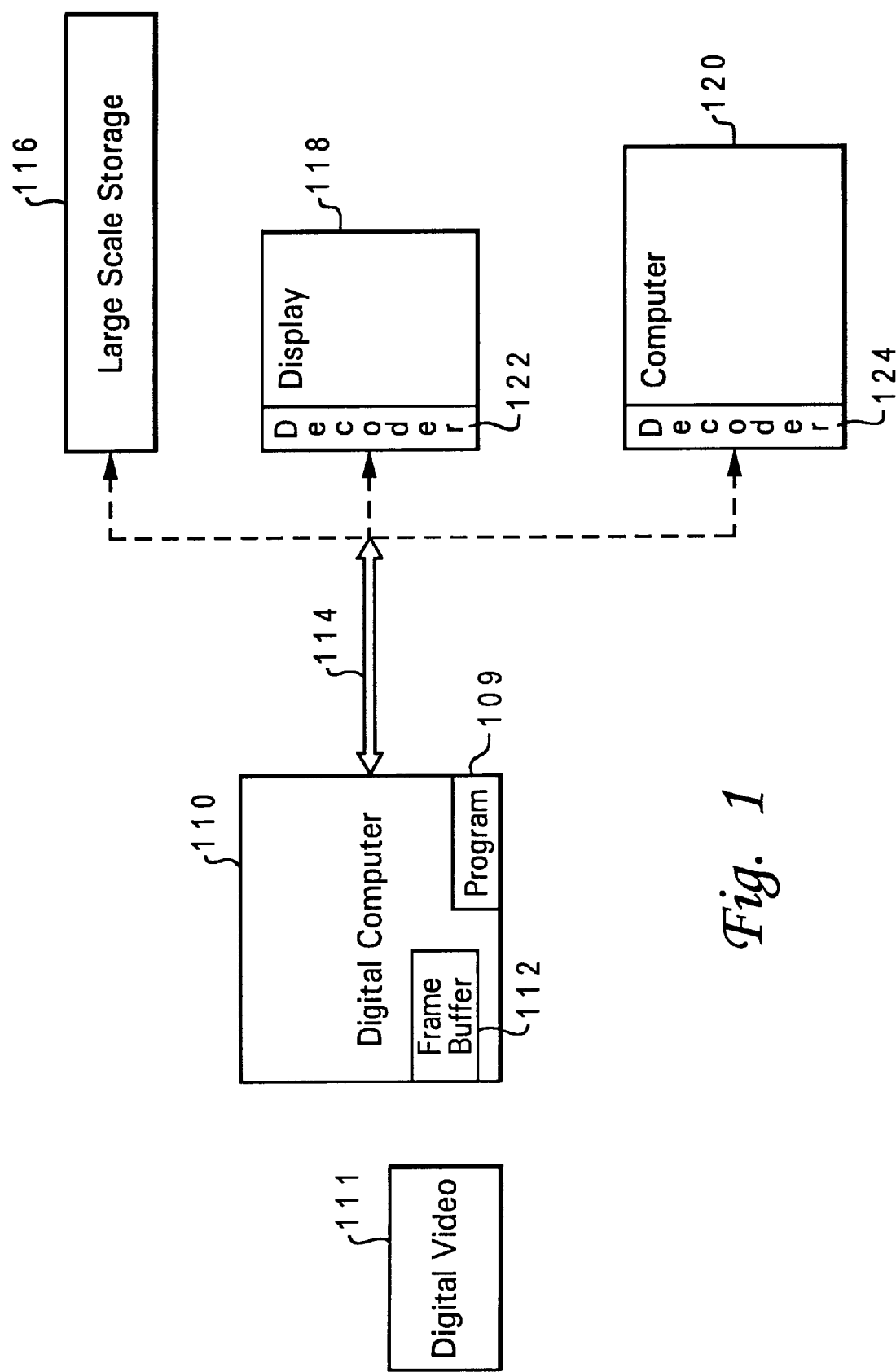

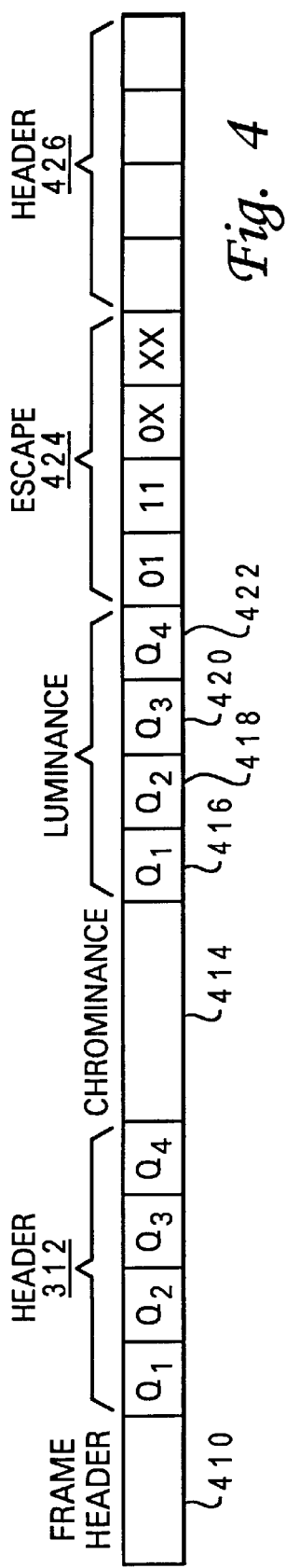
Fig. 4
Fig. 5
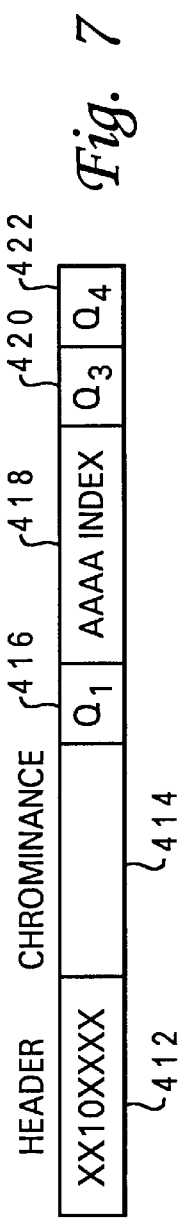
Fig. 6
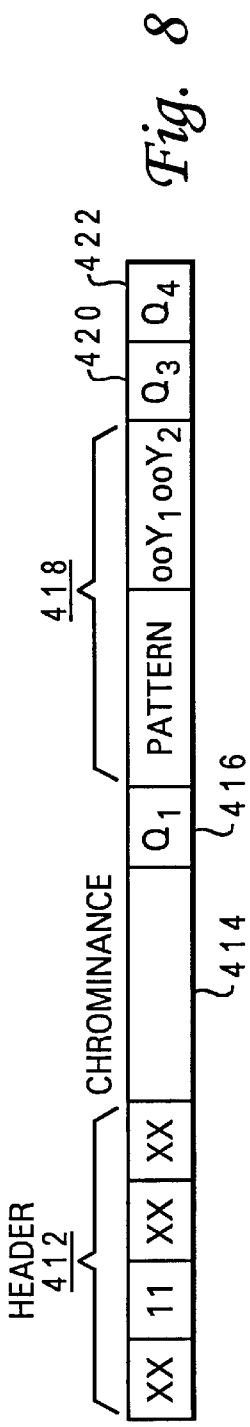
Fig. 7
Fig. 8

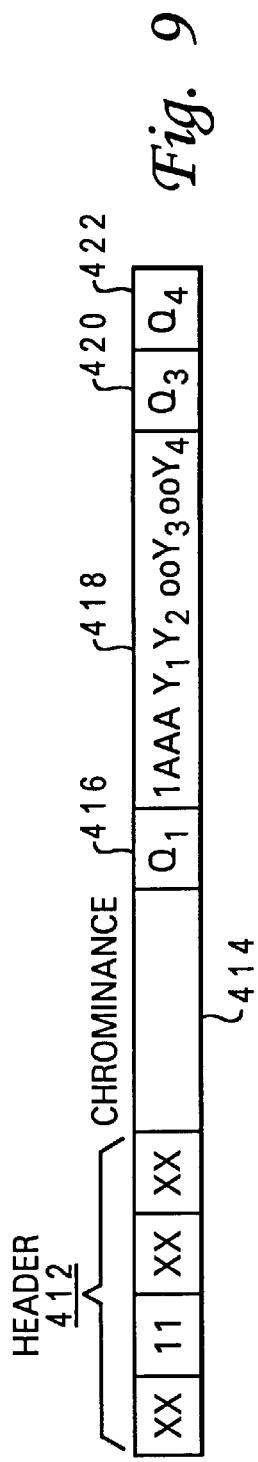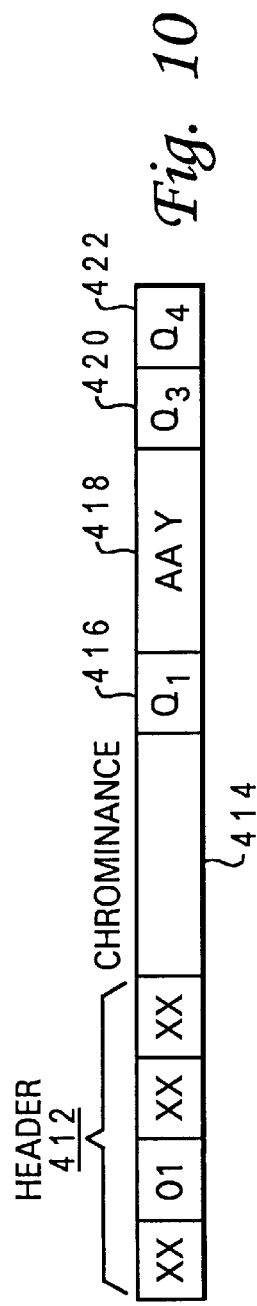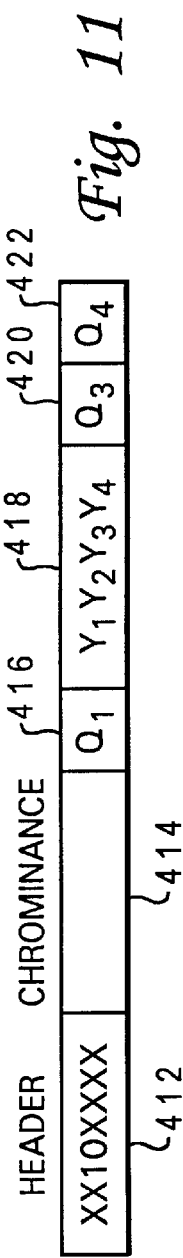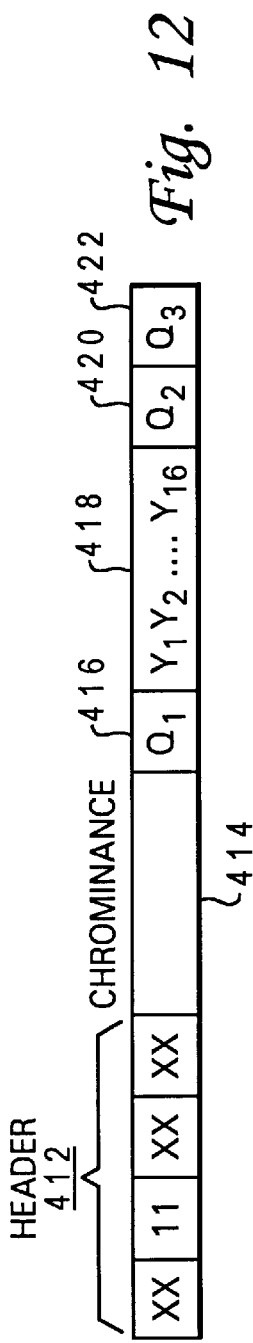

HYBRID VIDEO COMPRESSION/ DECOMPRESSION SYSTEM

FIELD OF THE INVENTION

This invention relates generally to systems for compressing luminance and chrominance information in a digitized video image. Image compression is effected by eliminating redundancies within the image information and also by discarding luminance information which would produce changes in a reproduced video display that would be imperceptible to a human observer.

BACKGROUND OF THE INVENTION

The ability to store and transmit full-color, full-motion images is increasingly in demand. These images are used, not only for entertainment, as in motion picture or television productions, but also for analytical and diagnostic tasks such as engineering analysis and medical imaging.

There are several advantages to providing these images in digital form. For example, the images are easier to enhance and manipulate and, as with all digital signals, digital video images can be regenerated accurately over several generations with only minimal signal degradation.

On the other hand, digital video requires significant memory capacity for storage and, equivalently, a high-bandwidth channel for transmission. For example, a single 512 by 512 pixel gray-scale image with 256 gray levels requires more than 256,000 bytes of storage. A full color image requires nearly 800,000 bytes. Natural-looking motion requires that images be updated at least 30 times per second. A transmission channel for natural-looking full color moving images must therefore accommodate approximately 190 million bits per second and one minute of full color video requires almost 2 gigabytes of storage.

As a result, a number of image compression techniques have been proposed to reduce the information capacity required for storage and transmission of digital video signals. These techniques generally take advantage of the considerable redundancy in any natural image and the limits of the human psycho-visual system which does not respond to abrupt time-based or spatial transitions. Both time-domain and spatial-domain techniques are used to reduce the amount of data used to transmit, record, and reproduce color digital video images.

For example, differential pulse-code modulation (DPCM) is a commonly-used compression technique which relies upon the fact that video images, generally, are quite redundant and that any transitions in the images are, for the most part, gradual. A DPCM encoder predicts each pixel value from previous pixel values. It then compares the actual value with the predicted value to obtain an error signal. The error is the encoded value. If the predictions are relatively accurate, the error will be small and its value will occupy a great deal less memory and/or bandwidth than the original video signal. The signal can be decoded by using the prediction algorithm in conjunction with the error signal.

A color image may be represented as a combination of luminance and chrominance (color-difference) signals. For example, a digitized color image may have one byte assigned for the color-difference signal for each pixel. This image information may be compressed by recognizing that the human psycho-visual system is limited in its ability to detect subtle variations in color and therefore assigning a single chrominance value to a group of neighboring pixels which are of approximately the same color.

One approach to chrominance information compression is described in United States patent application entitled "Variable Spatial Frequency Chrominance Encoding in Software Motion Video Compression", Ser. No. 08/165,372, filed Dec. 12, 1993 by Steven M. Hancock et. al. and assigned to the assignee of the present invention, the disclosure of which is hereby incorporated by reference and referred to in the remainder of this application as "variable chrominance sub-sampling".

Briefly, the above method entails dividing a video frame into contiguous rectangular blocks, each of which is further divided into quadrants. A "weighted average" of the chrominance values within each quadrant is then computed and the average of each quadrant is compared to the averages of other quadrants within a block. If the averages are sufficiently similar, i.e. within an acceptable threshold value of one another, a single chrominance value (a weighted average of all the chrominance values within a block) is used to represent the chrominance information of the entire block. If the averages are not sufficiently similar, chrominance values are assigned on a quadrant-by-quadrant basis.

A digitized image's luminance information can also be encoded for compression, but, because the human psycho-visual system is more sensitive to luminance changes than to color changes, greater care must be taken in compressing luminance information. Luminance compression techniques are well-known and a number of such compression techniques, are discussed in detail in chapters 18 and 19 of "Television Engineering Handbook", K Blair Benson, Editor in Chief, McGraw-Hill Book Company, 1986 which is hereby incorporated by reference.

As discussed in this handbook, a commonly-employed method of luminance information compression is called block truncation coding. This method entails dividing an image into contiguous, non-overlapping regions, then encoding the luminance of each of the regions using two luminance values and a bit mask. The bit mask indicates which of two luminance values is to be assigned to a particular pixel within the region. This method does produce luminance compression, but is very sensitive to region size. If the regions are too large, the image takes on a "contoured" look, thus degrading the image quality. On the other hand, if the regions are too small, very little image compression is achieved.

Additional approaches to luminance compression are described in the United States patent application entitled "Luminance Transition Encoder For Motion Video Compression", Ser. No. 08/170,044, filed Dec. 17, 1993 by Steven M. Hancock et. al., and in the United States patent application entitled "Hybrid Video Compression System and Method Capable of Software-only Decompression in Selected Multimedia Systems", Ser. No. 07/965,580, filed Oct. 23, 1992, by Arturo Aureliano Rodriguez et. al., both of which are assigned to the assignee of the present invention and the disclosures of which are hereby incorporated by reference.

Briefly, the Luminance Transition Encoder described in Ser. No. 08/170,044 analyzes the luminance values within a region, thereby determining the direction of maximum luminance variation and the location, magnitude, and abruptness of any luminance transitions within the region. Using these factors, the region's luminance is mapped into one of a predetermined set of luminance functions which, when decoded, produce luminance distributions which approximate those commonly found in natural images.

The Hybrid Video Compression System described in Ser. No. 07/965,580 (referred to hereinafter as statistical luminance encoding), in one embodiment, decomposes an image into non-overlapping regions and computes the average and standard deviation of the frame's luminance values. The standard deviation is used to determine a "Homogeneity threshold" which is also a function of the size of the regions into which the frame is decomposed. For each region, the encoder computes the mean luminance value, the average of all the luminance values within the region that are greater than the mean, and the average of all the luminance values within the region that are less than the mean. These values are used to determine whether a region is homogeneous. If a region is homogeneous, the entire region is assigned a single color. Additionally, if the region is unchanged from the previous frame, it is encoded as unchanged. If the region has changed but is not homogeneous, it is encoded using a bit map and two colors; one color assigned to the "1" locations, the other assigned to the "0" locations.

Although the above image compression systems reduce the amount of data required to represent an image, each system may exhibit advantages over the others with any given image. Further, various combinations of the above systems may prove even more advantageous than using any one of them in isolation. But, in order to use combinations of the systems, an encoder must include, within the image data stream, information that permits a decoder to determine which type of encoding was employed. That is, in addition to providing the means for interpreting data compressed by any of the above methods, an encoder that employs all the above methods must provide a facility for recognizing which type of compression is used for any given image segment. However, when the additional recognizing information is added to the data stream, it partially offsets the efficiencies achieved by the compression schemes.

Accordingly, it is an object of the present invention to provide a coding scheme which can utilize several compression schemes.

It is another object of the present invention to provide an efficient manner of encoding the type of compression scheme used.

SUMMARY OF THE INVENTION

The invention is a digitized image compression system which employs several different compression techniques to compress the luminance and chrominance information and encodes the technique selected "on the fly" by inserting selected escape and header codes into the encoded data stream. More particularly, during compression, each image is divided into non-overlapping contiguous regions, referred to hereinafter as blocks and image data is compressed on a block-by-block basis. Each encoded block begins with a one-byte header that indicates, in conjunction with a previous escape code, the compression technique which was used to encode the block. Therefore, interpretation of the encoded data is a hierarchical process: the escape codes indicate a stream interpretation mode which, in turn, determines the meaning of header values which follow and the header values, in turn, determine the meaning of the encoded data in each block.

For example, in one stream interpretation mode a "10" combination within a header may indicate that a portion of the associated block is encoded as a luminance transition code while, in another stream interpretation mode, the same "10" combination at the same location within the header may indicate that the block portion is encoded as a four-luminance encoded quadrant.

The majority of blocks are divided into quadrants and each block header is arranged as a sequence of four two-bit codes which indicate the encoding used for the four quadrants within the associated block. However, certain combinations of encoding that are unlikely to occur within the same block are inserted into the image data stream as the "escape codes" which designate the stream interpretation mode.

BRIEF DESCRIPTION OF THE DRAWINGS

The above and further advantages of the invention may be better understood by referring to the following description in conjunction with the accompanying drawings, in which:

FIG. 1 is a block diagram of the invention in use with digital video storage and communications equipment.

FIG. 4 illustrates the overall organization of an encoded frame.

FIG. 5 illustrates the format of an escape code.

FIG. 6 illustrates the format of a header which indicates that data in the associated block is unchanged from the previous frame.

FIG. 7 illustrates the format of a block which contains a quadrant encoded using luminance transition encoding.

FIG. 8 illustrates the format of a block which contains a quadrant encoded as a statistical pattern quadrant.

FIG. 9 illustrates the format of a block which contains a quadrant encoded as an extended luminance transition encoding quadrant.

FIG. 10 illustrates the format of a block which contains a quadrant encoded as a homogeneous/shallow gradient quadrant.

FIG. 11 illustrates the format of a block which contains a quadrant encoded as a sub-sampled four luminance quadrant.

FIG. 12 illustrates the format of a block which contains a quadrant encoded as a sixteen luminance quadrant.

DETAILED DESCRIPTION OF ILLUSTRATIVE EMBODIMENTS

Figure 2A:
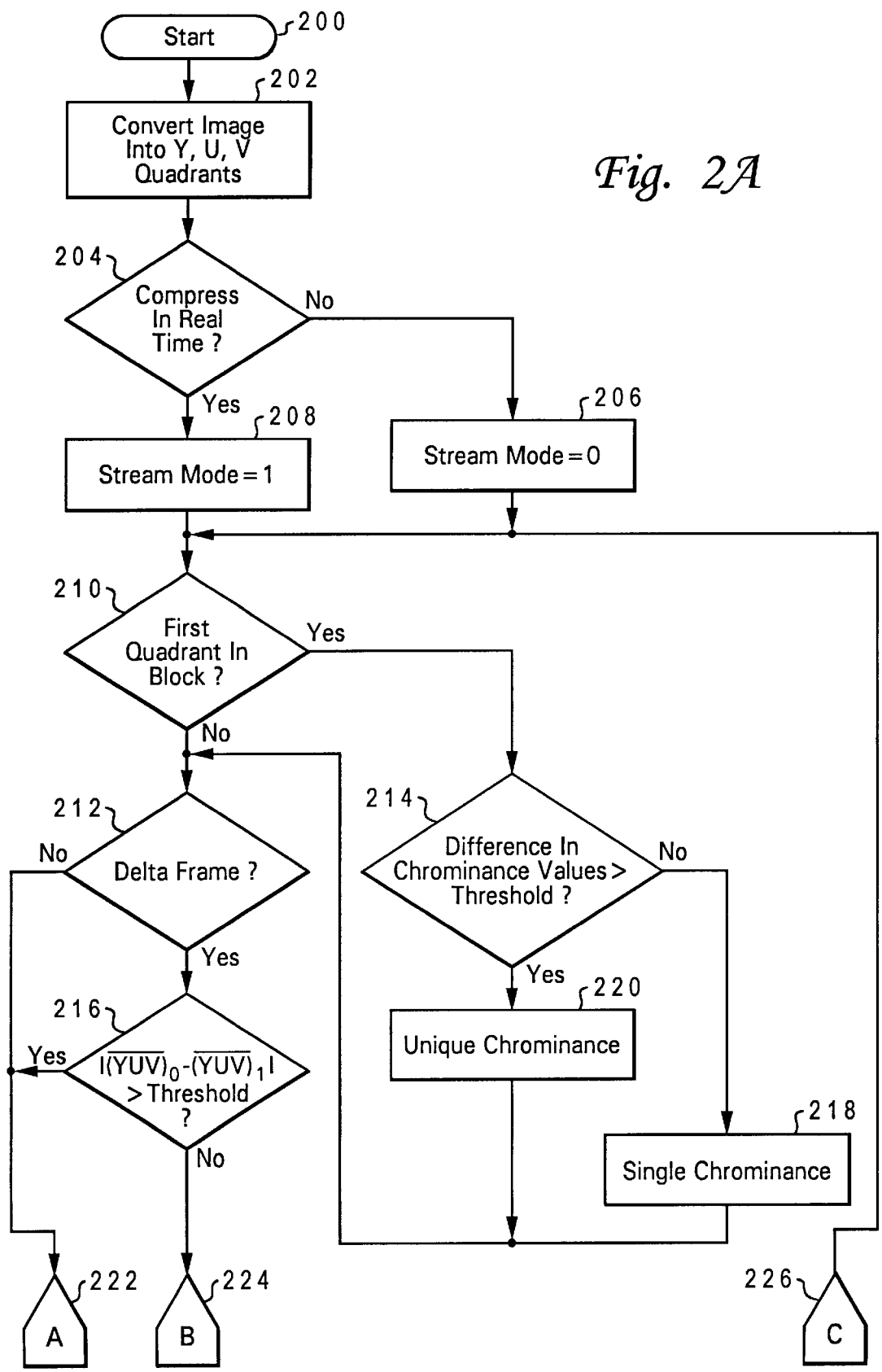
FIGS. 2A through 2D, when placed together, form a flowchart of the frame-encoding process employed by the invention.
Figure 2B:
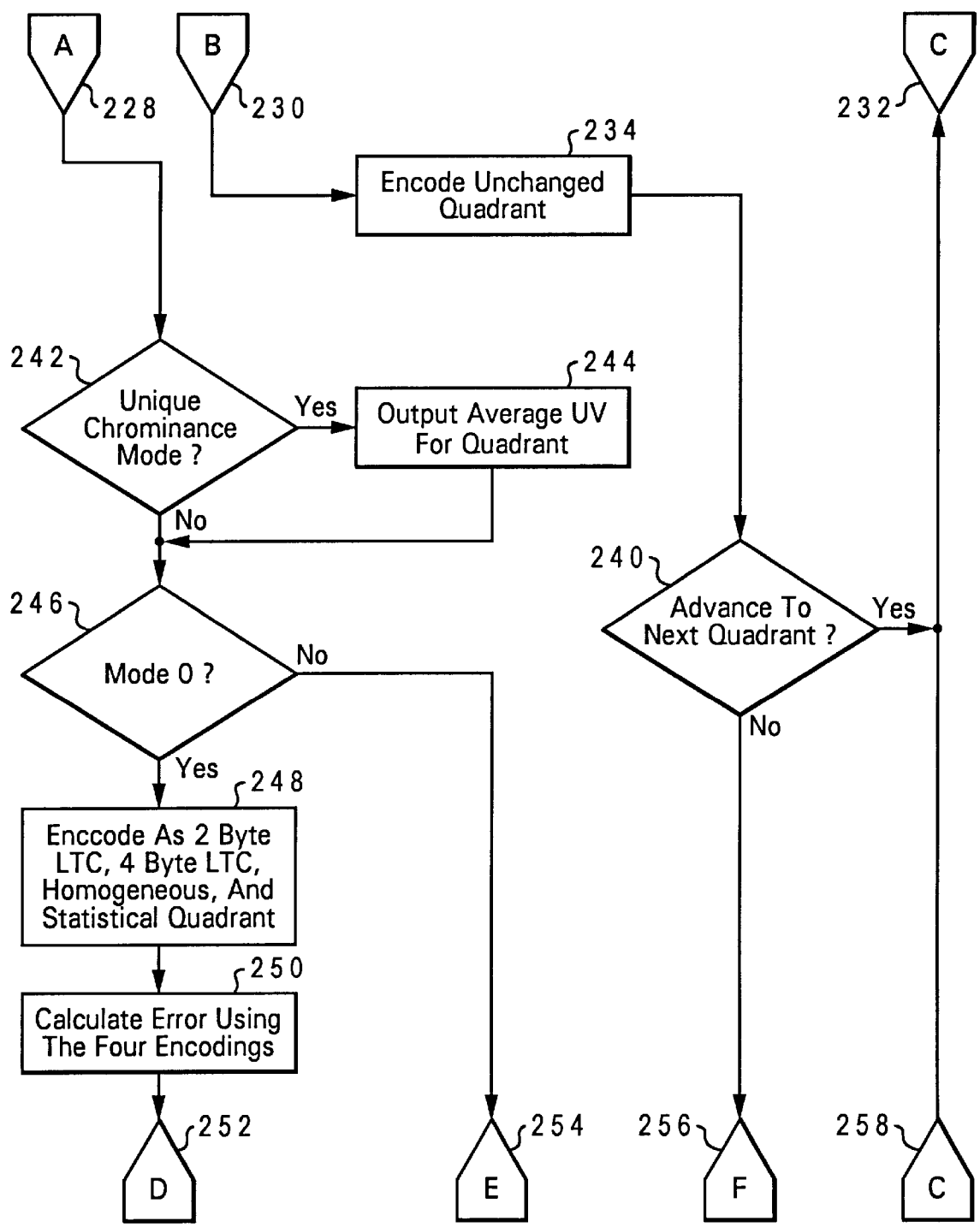
Figure 2C:
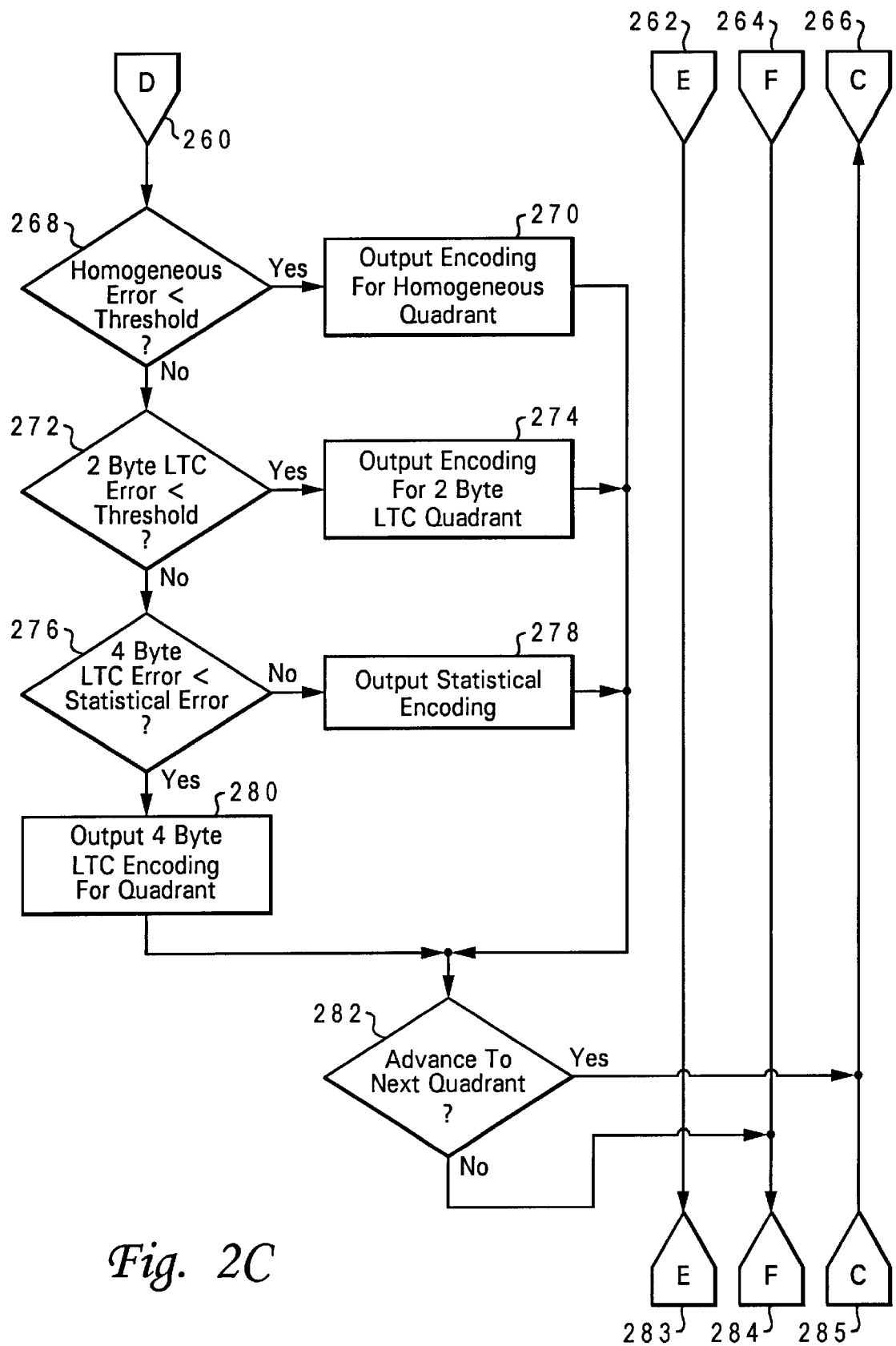
Figure 2D:
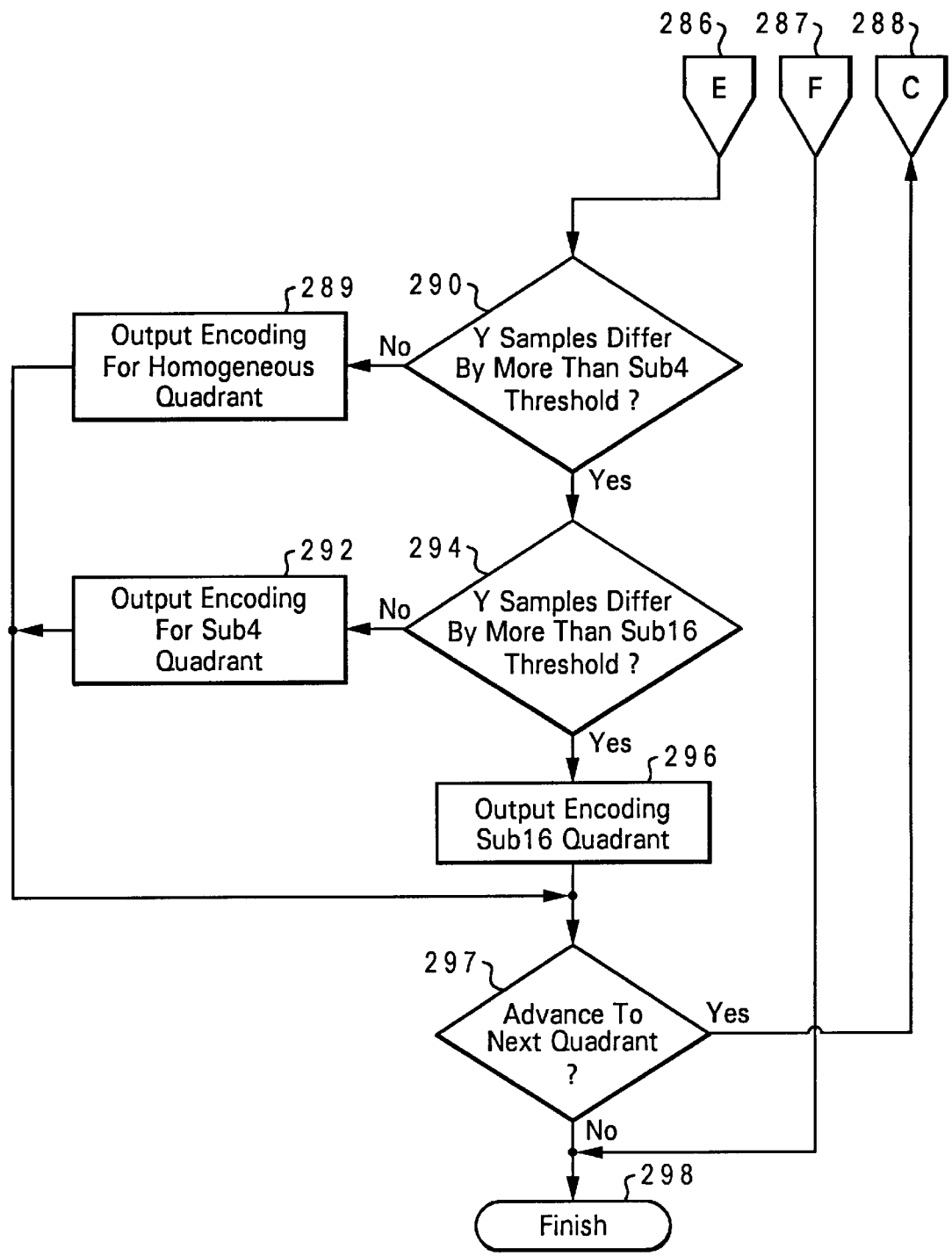

In accordance with FIG. 1, the invention is preferably practiced on a digital computer system. In such a system, a general purpose computer 110 operates under control of an applications program 109 which directs it to, inter alia, encode digital video information received from digital video source 111 and transfer the encoded information through communication path 114 to other devices such as storage device 116, a video display 118, and another computer 120.

The video display 118 also incorporates a decoder 122 by which it may accept video information encoded according to the invention, decode it, and display it. The other computer 120 also employs a decoder 124 to display video information encoded according to the invention. The storage unit 116 stores encoded video information for later retrieval by the digital computer 110, the display 118, or the computer 120.

The digital-video related information transferred along the path 114 is encoded by the computer 110 under control of the program 109 to reduce the data capacity required for accurate reproduction of the video signal. Therefore the transmission path 114 will be of a lower bandwidth capacity than would be required if the video information were not encoded. Further, the large-scale storage device 116 is of lower capacity than would be required for non-encoded video information storage.

More particularly, the digital video source 111 may, for example, comprise a hardware peripheral which samples an analog video signal and digitizes the signal to produce a stream of digital words. This source may perform data compression as discussed previously and data compression may also be performed by computer 110. Any of the above-described data compression methods and combinations thereof may be employed by the computer 110 under control of the program 109 to encode digital video images.

During the encoding process, a frame buffer, 112, which may be physically located within the computer 110, receives an incoming digital data stream and stores, in a luminance/chrominance format, at least one video frame-full of data provided by digital video source 111. The computer 110 has random access to the information contained in the frame buffer 112, and, in accordance with the principles of the invention, the computer 110 reads the digital information out of the frame buffer 112 and inserts the escape codes and block headers necessary to decode the compressed information stream.

The flowchart of FIGS. 2A through 2D, when placed together, discloses generally the operation of a digital video encoding method carried out in accordance with the principles of the invention which encoding method can be performed by the computer 110 of FIG. 1.

The encoding process begins at step 200 and proceeds to step 202 where the image is converted into blocks and each block is divided into four quadrants which are ordered, starting from the upper right quadrant and proceeding clockwise. This image information in each quadrant is then converted into chrominance and luminance information (Y, U and V signals) in a conventional manner. Proceeding from step 202, the encoder determines, at step 204, whether the image is being compressed in real-time. If the image is being compressed in real time, the encoder proceeds to step 208, where it sets the bit stream interpretation mode equal to "1". If, on the other hand, the image is being compressed "asymmetrically", or off-line, the encoder proceeds to step 206 where it sets the bit stream interpretation mode equal to "0".

Following either of steps 206 or 208, the encoder proceeds to step 210 where it determines whether the quadrant currently being encoded is the first quadrant within the block. If the quadrant being decoded is the first quadrant of the block, the encoder proceeds to step 214, where the encoder further determines whether the differences in chrominance values within the block exceed a predetermined threshold.

If the differences in chrominance values within the block do not exceed the predetermined threshold, the encoder proceeds to step 218, where the chrominance mode is set to a single chrominance mode. This single chrominance mode provides one chrominance value to be shared by all the quadrants within the block. Additionally, the encoder places this shared chrominance value in the proper location within the bit stream.

Alternatively, if, in step 214, the encoder determines that the differences in chrominance values within the block exceed the predetermined threshold, in step 220, the encoder sets the chrominance mode to the unique chrominance mode. This latter mode indicates that an individual chrominance value is provided for each quadrant within the block.

Following steps 218, 220 or 210 (if the quadrant being encoded is not the first quadrant within the block to be encoded), the encoder proceeds to step 212 where the encoder determines whether the frame being encoded is a "delta frame". Generally, the compression routine generates one of two types of output frames: delta frames or reference frames. A delta frame is a frame in which some of the quadrants may be encoded with reference to a previous frame, that is, a quadrant may be encoded as a quadrant that has not changed from the corresponding quadrant in the previous frame. In contrast, a reference frame is a frame in which none of the quadrants are encoded by referring to a previous frame. Although, generally, images are encoded as delta frames, reference frames are inserted throughout the video data stream (at approximately two second intervals). The reference frames aid in implementing such features as video frame search, whereby a video frame at a random location within the video data stream may be decoded and displayed. The utility of reference frames is made apparent by considering that, without reference frames, a decoder must decode all delta frames intervening between the desired frame and the closest frame that is not encoded in reference to a previous frame. With reference frames inserted into the video data stream, a decoder only need decode the reference and intervening frames to obtain the desired frame.

If, in step 212, the encoder determines that the current frame is a delta frame, the encoder proceeds to step 216, where it compares the average chrominance and luminance values for the quadrant $(YUV)_0$ to the average luminance and chrominance values for the corresponding quadrant in the previous frame $(YUV)_1$. If the absolute value of the differences generated in this comparison process do not exceed predetermined thresholds (Threshold), the encoder proceeds, via off-page connectors "B" 224 and 230 to step 234 where it encodes the quadrant as an "unchanged" quadrant. Following step 234, the encoder proceeds to step 240, where a determination is made whether any quadrant data remains. If so the encoder proceeds, via off-page connectors "C" 232 and 226 to step 210 where data for the next quadrant is retrieved and the encoder proceeds to process the data as previously described. Alternatively, if there is no further quadrant data, the encoder proceeds, via off-page connectors "F" 256, 264, 284 and 287, to finish in step 298.

If the encoder determines, in step 212, that the frame being encoded is not a delta frame, or, in step 216, that the predetermined threshold is exceeded, the encoder proceeds, via off-page connectors "A" 222 and 228, to step 242 where the encoder determines whether the current quadrant is being encoded using the unique chrominance mode or single chrominance mode. If the quadrant is being encoded in the unique chrominance mode, in step 244, the encoder places the average quadrant chrominance information in the proper location within the data stream. If, in step 242, the encoder determines that the chrominance mode is the single chrominance mode, the encoder recognizes that, in step 218 discussed previously, the shared chrominance value for the block was already inserted in the proper location within the video data stream and the encoder therefore proceeds, as it does after step 244, to step 246.

In step 246, the encoder determines the stream interpretation mode (set in step 206 or 208). If the mode is mode 0, the encoder proceeds to step 248, where it encodes the quadrant luminance information in four different ways: as a two-byte luminance transition code (LTC), as a four-byte LTC, as a homogeneous quadrant, and as a statistical quadrant. Next, the encoder proceeds to step 250, where it calculates the error associated with each of the four encoding methods employed in step 248.

After computing the error values in step 250, the encoder proceeds via off-page connector "D" 252 and 260 to step 268 where it compares the error value for homogeneous encoding to a predetermined threshold. If the error value does not exceed the threshold, the homogeneous encoding, which yields the greatest compression of the four encoding methods employed in step 248, yields an image of satisfactory quality and the encoder proceeds to step 270, where the encoder places the homogeneous encoding values (block header value and associated quadrant data) in the appropriate locations within the bit-stream then proceeds to step 282.

If, in step 268, the encoder determines that the homogeneous encoding yields an image of unsatisfactory quality, i.e., the error value exceeds the threshold, the encoder proceeds to step 272, where it determines whether the error associated with the two-byte LTC encoding, computed in step 248, exceeds the predetermined threshold. If it does not, the image quality is deemed satisfactory and the encoder, in step 274, places the two-byte LTC encoding values (block header and quadrant data) in the appropriate locations within the bit-stream, then proceeds to step 282.

If, in step 272, the encoder determines that the two-byte LTC encoding yields an unsatisfactory image, the encoder proceeds to step 276, where it compares the error associated with four byte LTC encoding to that associated with statistical encoding and employs whichever encoding yields a better image. That is, if statistical encoding yields a better image, the encoder proceeds to step 242, where it places the statistical pattern encoding values in the appropriate locations within the bit stream. On the other hand, if four byte luminance transition encoding yields better results, the encoder proceeds to step 280 where it places the four-byte luminance transition encoding values in the appropriate locations within the bit-stream.

Following steps 270, 274, 278 or 280, the encoder proceeds to step 282 where it determines whether there are any further quadrants within the image to encode. If there are none, i.e., if the entire image has been encoded, the encoder proceeds through off-page connector "F" 284 and 287 to finish in step 298. If there are more quadrants to decode, the encoder retrieves data for the next quadrant, then proceeds through off-page connector "C" 266 and 226 to step 210 where it proceeds as previously described.

Returning to decision block 246, if the decoder determines that the stream interpretation mode is mode 1, the decoder proceeds through off-page connector "E" 254 and 286 to step 290 it determines whether the luminance samples for the quadrant differ by more than a predetermined threshold which would indicate that the quadrant must be encoded, at the very least, using sub-sampled four luminance encoding. If the luminance values do not exceed this threshold, the encoder proceeds to step 289 where it places quadrant image information obtained through homogeneous encoding into the output bit-stream.

If, in step 290, the luminance samples exceed the predetermined threshold, the encoder proceeds to step 294 where it determines whether the luminance values exceeds a predetermined sub-sampled sixteen-luminance encoding threshold and, if they do not, the encoder proceeds to step 292, where it places quadrant image information obtained through sub-sampled four luminance encoding into the output bit-stream.

If the luminance samples do differ by more than the predetermined threshold employed in step 294, the encoder proceeds to step 296 where it places quadrant image information obtained though sub-sampled sixteen luminance encoding into the output bit-stream. Following steps 289, 292, or 296 the encoder proceeds to step 297 where it determines whether the quadrant just encoded is the final quadrant within the image frame and, if it is, proceeds to step 298, finish. If there are more quadrants within the image to encode, the encoder proceeds, through off-page connector "C", 288 and 226, to step 210 where the encoder proceeds as previously described.

Figure 3A:
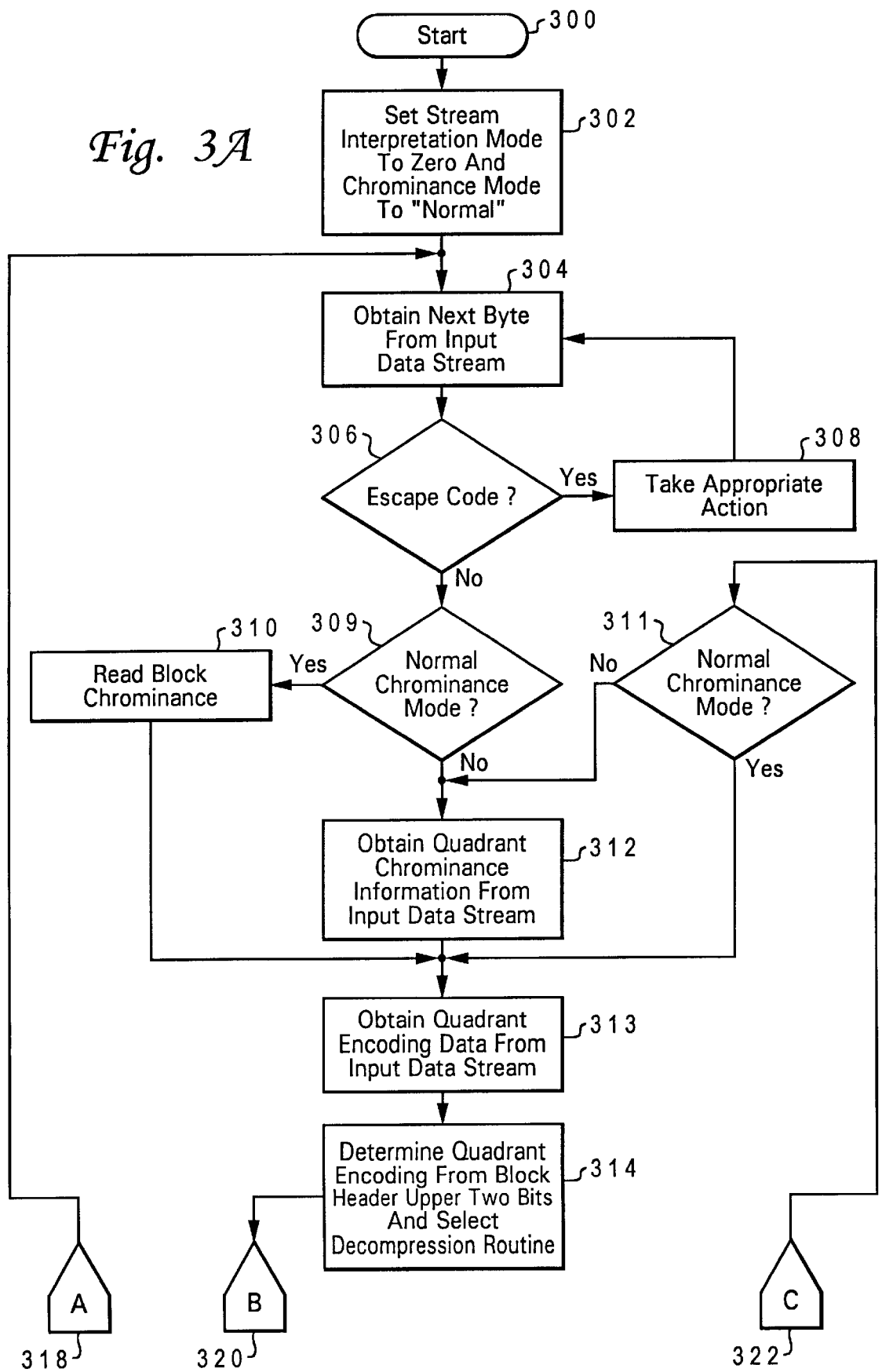
FIGS. 3A and 3B, when placed together, form a flowchart of the frame-decoding process employed by the invention.
Figure 3B:
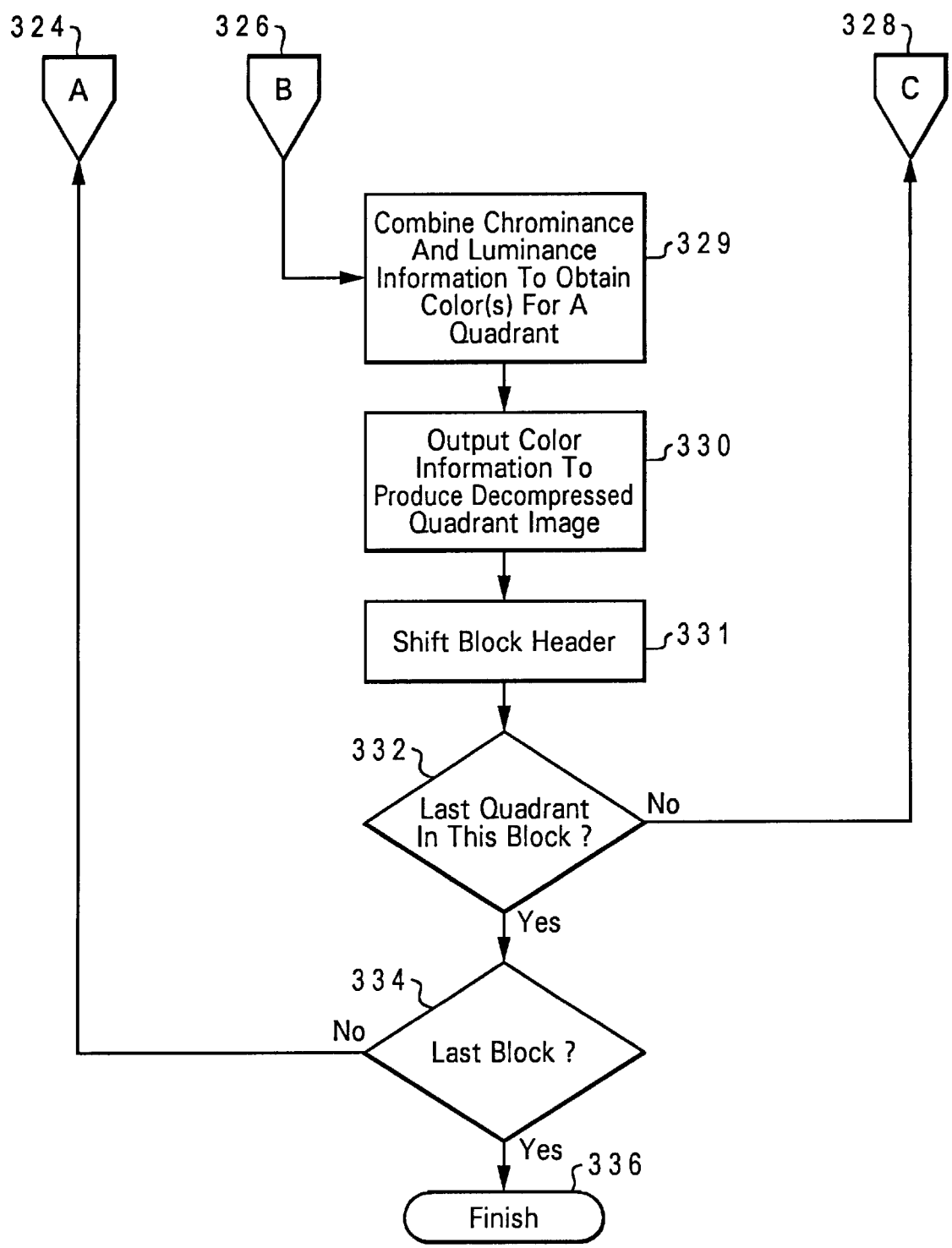

The flowchart of FIGS. 3A and 3B (when placed together) discloses generally the operation of a digital video decoding method carried out in accordance with the principles of the invention which decoding method can be performed by the computer 120 or may be effected by special purpose hardware such as the decoder 122. The flowchart depicts operation of the decoding method for one frame of digital video data stored in the frame buffer, proceeding block by block, in raster fashion, from the upper left corner of the frame to the lower right corner.

Operation begins at step 300 and proceeds to step 302 where decoder parameters are initialized. For example, data-stream interpretation modes, to be described later, are set in this step (in the preferred embodiment, the stream interpretation mode defaults to mode 0 and the chrominance mode is "normal"). In addition, information such as the frame header, if present, may be removed at this point. Operation then proceeds to step 304, where the next byte of data is obtained from the input data stream. In step 306, the routine determines whether the byte of data obtained in step 304 is an escape code or block header. If it is an escape code, the computer proceeds to step 308 where it takes appropriate action based on the particular escape code encountered, then returns to step 304. Such action may involve, for example, setting the current stream interpretation mode. Escape codes and the actions taken in response to them are discussed in greater detail in conjunction with the description of FIG. 4.

If, in step 306, a determination is made that the byte of data obtained in step 304 is not an escape code, the data must be a block header, therefore, the routine proceeds to step 309 where it determines the chrominance mode for the block. If the chrominance mode is "normal", the decoder proceeds to step 310, where it retrieves chrominance information that will be shared by all the quadrants within the block and from there to step 313. If, on the other hand, the chrominance mode is "unique", the decoder proceeds to step 312, where it obtains the unique quadrant chrominance information and then proceeds to step 313.

In step 313, in either the normal or unique chrominance modes the chrominance encoding data is retrieved from the input data stream, and, in step 314, the decoder determines the quadrant encoding type from the upper two bits of the block header and selects a decompression scheme accordingly. After decoding the block header in step 314, the routine proceeds, via off-page connectors "B", 320 and 326, to step 329 where it combines luminance and chrominance information bytes from the input data stream to generate colors for the associated quadrants within the block. Each block is divided into four quadrants and the luminance and chrominance information for the quadrants within a block is arranged in sequence beginning with the "northwest", i.e., upper left, quadrant and proceeding in a counter-clockwise direction. The number of compressed luminance and chrominance bytes retrieved from the frame buffer for each quadrant depends on the type of encoding used which can be determined from the decoded stream interpretation mode and block header information. As will be discussed in detail hereinafter, the stream interpretation mode is used to interpret the decoded block header information. The combination of chrominance and luminance information to generate colors is well-known in the art and may be accomplished, for example, by concatenating an eight-bit chrominance value with a six-bit luminance value then using the result as an index to a table of color values. The routine then proceeds to step 330 where the color information is inserted into the output data stream as decoded digital data. Then, in step 331, the decoder shifts the block header two bits so that, in step 314, when the upper two bits are examined to determine the quadrant encoding, the encoding is related to the proper quadrant.

After generating the color information for a quadrant, the routine proceeds to step 332 where a determination is made whether output information has been generated for the last quadrant within the block currently being decoded. If not, the routine proceeds, via off-page connectors "C" 328 and 322, to step 311 where a determination is made where the block is encoded using the normal chrominance mode or the unique chrominance mode. If the block has been encoded with the normal chrominance mode, the encoder proceeds directly to step 313 where the quadrant encoding data is retrieved, the block chrominance value having been previously read in step 310. On the other hand if the block has been encoded in the unique mode, the encoder proceeds to step 312 to retrieve the unique quadrant chrominance information. Operation then proceeds as previously described in order to decompress and decode the information.

If, in step 332, the routine determines that color information has been generated for all the quadrants within the block, it proceeds to step 334 where a determination is made whether the last block within the video frame has been decoded. If it has not, the routine returns, via off-page connectors "A" 324 and 318, to step 304 where it retrieves the next byte of date from the data stream and checks for an escape code as previously described. Alternatively, if the routine determines in step 334 that the last block within the video frame has been decoded, it proceeds to step 336 to finish.

FIG. 4 illustrates the general organization of one encoded frame of data. The frame header 410, which is optional, may include information regarding the frame size, which frames are delta frames, etc. Header 412 is a one-byte block header. Each of the four pairs of bits which compose the block header 412 is associated with one of the quadrants within the block. Thus, the two bits labeled $Q_1$ within header 412 are associated with the first, or "northwest" quadrant of the block and determine how luminance and chrominance information for that quadrant is compressed. Similarly, the two bits labeled $Q_2$ in header 412 are associated with the second, or "southwest", quadrant of the block and determine the decompression of luminance and chrominance information for that quadrant. The third, "southeast", and fourth, "northwest", quadrants have associated with them bit-pairs $Q_3$ and $Q_4$ respectively, of header 412.

Depending upon the chrominance compression scheme, chrominance information for an entire block may be contained within one byte 414, which is used in combination with the luminance information for each quadrant within the block to generate color(s) for the quadrants. Alternatively, each quadrant may have a unique chrominance value assigned to it (not shown). Chrominance compression schemes are identified by escape codes and are therefore discussed in greater detail in conjunction with the description of the escape codes associated with FIG. 5. In general, the initial compression routines determine which compression technique to employ, based on a comparison of the degree of compression and quality of image achieved with each one (see e.g., the aforementioned patent application entitled "Luminance Transition Encoder For Motion Video Compression", Ser. No. 08/170,044, for an example of one method of reaching a compromise between the degree of compression achieved and the resultant image quality).

Quadrant luminance data is contained within the variable-length data segments 416, 418, 420, and 422. Segment 416 contains luminance information for the first quadrant, segment 418 contains luminance information for the second quadrant, etc. The contents and length of each quadrant's data segment depends on the type of compression used for the quadrant and, of course, the color content of the corresponding area of the original image.

The escape code 424, is shown in the bit-stream between the data for one block (comprising header 412, chrominance information 414 and luminance information 416–422) and the next consecutive raster-order block (which begins with a header 426). Escape codes are one-byte codes which assume values from 70 to 77 (hexadecimal) and can be inserted, as illustrated, between any two sets of block color data. The combinations, 70–77 (hex), are selected because they are unlikely to occur as header values and therefore can be recognized as escape codes. Illustrative header values, and the reasons these combinations of header values are unlikely to occur will be discussed in detail below.

FIG. 5 illustrates, in more detail, the construction of an illustrative escape code 424 which might be inserted into a data stream.

This particular code, 74 (hex), indicates that a group of blocks are unchanged from the previous frame and is followed by a "run" byte 425 indicating how many blocks, in raster sequence, are unchanged. In this 1example, run byte 425 has the value 3, indicating that the next three blocks are unchanged from the previous frame.

Another escape code which can be used is escape code 70 (hex, not shown) which is used as a generalized escape code that is always followed by a one-byte control value. The one-byte control value provides for 255 values of the basic escape code 70 (hex). Two selected values of this one-byte control value are used to determine the "stream interpretation mode". Stream interpretation modes enable the same header information to be decoded in one of several different ways.

In particular, a value of "zero" for this latter control value indicates that the stream interpretation mode is mode zero and a value of "one" indicates the stream interpretation mode is mode one. For example, when the stream interpretation mode is mode zero, a two-bit code within a block header having the value "10" may be decoded to indicate that the associated quadrant was encoded using linear transition coding. However, when a mode one stream interpretation mode is in effect, the same value,"10", may be decoded to indicate that the associated quadrant was encoded as a sub-sampled four-luminance quadrant. A complete discussion of stream interpretation modes and their effect on the interpretation of header values is found in the discussion of header values which follows this discussion of escape codes.

Continuing with the discussion of escape codes, escape code 71 (hex) indicates that the following block was compressed using "unique chrominance" compression. That is, the next sequential block in the bit-stream was encoded with a unique chrominance value for each quadrant within the block.

Escape code 72 (hex) is a "toggle" between normal and unique chrominance modes. When this code is encountered in the data stream the decoding routine switches from its current chrominance interpretation mode to the other interpretation mode, e.g., from unique to normal or normal to unique, then continues to operate in the new chrominance mode until another 72 (hex) escape code is encountered. In the normal chrominance mode, a single eight-bit chrominance code is used to reconstruct the color for all quadrants within a block. In the unique chrominance mode, each quadrant within a block is assigned an eight-bit chrominance value.

Escape code 73 (hex) acts as a "frame guard". At least one frame guard is inserted by an encoding routine into the data stream at the end of a complete frame of data. The corresponding decoding routine searches for this frame guard at the end of the frame information (as determined by step 222 in FIG. 2), and if it is not found immediately following the data for the last block in the frame being decoded, or, if a frame guard is encountered before the last block of data for a frame, the decoding routine recognizes that an error in decoding the frame has occurred and may take corrective action. No other escape codes have been defined for this exemplary embodiment, but additional codes corresponding to codes 74–77 could be employed for various additional decoding branches.

Quadrant header codes and data will now be discussed in association with FIGS. 6–12 which portray the various codes that an encoding routine may place in a block header 412 and the corresponding data format for associated quadrants. Generally, FIGS. 7, 8 and 9 depict the format for mode zero stream interpretations, FIGS. 11 and 12 depict the format for mode one stream interpretations, and FIGS. 6 and 10 depict formats which are the same for either stream interpretation mode.

FIG. 6 is a block header 412 with all bit-pairs equal to zero. A bit pair of zero in either stream interpretation mode indicates that the associated quadrant is unchanged from the previous frame. The block header 412 of FIG. 6 therefore indicates that all quadrants within the block are unchanged from the previous frame. Unchanged blocks may be encoded in this manner, with all bit pairs within a header set equal to zero, or, as described previously, as an escape code 74 (hex) followed by a run byte that indicates the number of sequential blocks unchanged from the previous frame. If more than two bytes are unchanged, the escape code approach is preferred.

FIG. 7 illustrates the format of a block which contains a two-byte luminance-transition-encoded quadrant. Bytes 1, 3 and 4 of the header 412 may be encoded with any encoding scheme, the details of which are not important for the purposes of this discussion and accordingly, a discussion of the details has been omitted for clarity. The second bit-pair within the header 412 has the value "10" (binary) which, in stream interpretation mode zero, indicates that the associated quadrant, quadrant two, is encoded as a two-byte luminance transition code. The header 412 is followed by a one-byte chrominance value 414 which, in this and all following examples, is shared by all quadrants in the block (i.e., FIGS. 7–12 all illustrate examples that employ the "normal" chrominance mode).

Next in sequence is the data segment 416 which contains luminance information for the first quadrant, which information, as previously-described, may be compressed using the same or a different encoding scheme as the second quadrant. Following data segment 416 is data segment 418, which, as indicated in the second byte of the header 412 is a two-byte luminance transition code that provides the luminance information for quadrant two. As illustrated, the two-byte luminance transition code consists of four angle bits labeled AAAA, and an index which, in combination, provide a luminance pattern for the second quadrant (see previously-identified application Ser. No. 08/170,044 for a more detailed discussion of luminance transition encoding). Data segments 420 and 422 contain luminance information for quadrants 3 and 4, respectively, and complete the compressed information in the block.

FIG. 8 depicts the format for a block which contains a "statistical pattern" encoded quadrant, another mode-zero stream interpretation encoding. The block header 412, chrominance byte 414, and data segments 416, 420 and 422 play the same role as previously described in relation to FIG. 7. The second bit-pair within the block header 412 has the value 11 (binary), which indicates that the corresponding second quadrant is a statistical pattern quadrant. The data segment 418 encompasses, 4 bytes, the first two bytes of which are labeled "pattern". Each of the sixteen bits which compose the pattern is assigned to a pixel location within the block in raster-scan order. The most significant bit of the two bytes is always set to a "0" to distinguish this type of coding from another coding type as discussed below. (For purposes of illustration it is assumed that blocks are 8 pixels by 8 pixels and quadrants, therefore, 4 pixels by 4 pixels, but other embodiments are within the scope of this disclosure). Thus, a pattern of ones and zeros corresponding to pixel locations within the block is contained in the 2 bytes labeled pattern. Each of the following 2 bytes contain a 6 bit luminance value (labeled $Y_1$ is and $Y_2$) one of which is assigned to pixel locations for which the corresponding bit in the pattern is a "0" and the other of which is assigned to pixel locations for which the corresponding bit in the pattern is a "1".

FIG. 9 illustrates the format of a block that contains a four-byte luminance transition encoded quadrant. The header 412, chrominance byte 414, and luminance segments 416, 420, and 422 are assigned as previously described. The second two-bit pair within the block header 412 has the value 11 (binary).

Although this is the same binary value and the same stream interpretation mode that yielded the statistical pattern decoding of FIG. 8, this encoding is distinguishable from statistical pattern encoding in that the first bit of the luminance data segment 418 is a "1" for four-byte luminance transition encoding, while the first bit of the luminance segment for statistical pattern encoding is a "0" as discussed above. Following the initial "one" bit within data segment 418 are three angle bits, labeled AAA and four six-bit luminance values $Y_1, Y_2, Y_3, Y_4$ which a decoding routine employs in accordance with the methods of the luminance transition encoder (see previously-mentioned U.S. patent application file number 08/170,044) to decode color values for each pixel within quadrant two.

FIG. 10 depicts the format of a block containing a homogeneous/shallow gradient quadrant. Header 412, chrominance byte 414, and data segment 416, 420, and 422 are assigned as described above. The two-bit pattern "01" (binary) indicates that the corresponding quadrant (quadrant two in this example), is encoded as a homogeneous/shallow gradient quadrant. As indicated above, the "01" pattern indicates a homogeneous/shallow gradient quadrant regardless of the stream interpretation mode. The first two bits of a homogeneous/shallow gradient encoding, AA in bye 418, indicate the direction in which luminance increases within the quadrant. The remaining 6 bits within byte 418 indicate a base luminance value. For example, if the bits labeled AA have the value 00, the quadrant is homogeneous and the chrominance value given in segment 414 is combined with the luminance value Y to provide a single color for all pixels within the quadrant. If the bits labeled AA do not equal 0, the luminance values Y and Y+1 are employed in accordance with one-byte luminance transition encoding to generate colors for all pixels within the quadrant.

FIG. 11 illustrates the data-stream format for a block that contains a sub-sampled four-luminance quadrant (see aforementioned patent application Ser. No. 07/965,580 for a more complete description of sampled four-luminance compression techniques). The header 412, chrominance byte 414, and quadrant luminance segments 416, 420, and 422 are assigned as previously described. When operating in stream interpretation mode one, the two-bit pair "10" indicates that the corresponding quadrant was encoded as a sub-sampled four-luminance quadrant. As indicated, the luminance data segment 418 contains four six-bit luminance values (three bytes). Each luminance value is associated with a two-pixel by two-pixel region within the quadrant. That is, $Y_1$ is associated with the "northwest" region, $Y_2$ is associated with the "northeast" segment, $Y_3$ with the southwest segment, and $Y_4$ with the southeast segment. These luminance values are combined with the chrominance value for the quadrant to produce four colors, one for each region, for the quadrant.

FIG. 12 depicts the data stream format for a block that contains a sixteen-luminance quadrant. The two-bit header value "11" (binary) indicates, in the "mode one" stream interpretation mode, that the corresponding quadrant is compressed as a sixteen-luminance quadrant. Thus, the luminance data segment 418 includes sixteen six-bit luminance values (12 bytes total), one for each pixel in the quadrant (in left to right, top to bottom raster scan order) and, when these values are decompressed, each pixel within the quadrant could have a unique color.

As noted above, some coding combinations are unlikely to occur within one quadrant. Specifically, the probability that block headers will take on the values 70 through 77 (HEX) is less than 0.5%. The reason for this low probability can be understood with reference to the block-header codes discussed above. That is, when operating in stream interpretation mode "0", a 01110xxx combination in the block header would indicate that the first quadrant was homogeneous or nearly so, that the second quadrant exhibited a great deal of inhomogeneity, and that the third quadrant was either unchanged from the previous frame or homogeneous. Similarly, when operating in the stream interpretation mode "1", a 0110xxx combination would indicate that the first quadrant was homogeneous, the second quadrant substantially inhomogeneous, and the third either unchanged or homogeneous. It is unlikely that any natural image would exhibit such a combination of smooth and abrupt color transitions within a region as diminutive as, for example, eight-pixels by eight-pixels.

In the small percentage of cases where these combinations do occur, the encoding routine must recognize that the resultant block header pattern would be the same as an escape value and modify the compression encoding to avoid ambiguity. That is, in one exemplary embodiment, when operating in stream interpretation mode 0, if the third quadrant is an unchanged quadrant, resulting in a 011100xx block header value, the encoding routine recognizes this pattern and modifies the compression encoding for the third quadrant to change it to a two-byte luminance transition encoded quadrant (10), a four byte luminance transition encoded quadrant (11), or a statistical pattern quadrant (11), whichever provides the best results. Thus, the ambiguous block header pattern is eliminated. Alternatively, if the third quadrant is a homogeneous quadrant, resulting in a block header value of 011101xx, the encoding routine changes the encoding for the third quadrant to a two-byte luminance transition encoding (10) in order to avoid the ambiguous header pattern.

In stream interpretation mode 1, if the third quadrant is unchanged, resulting in a 011100xx block header value, the encoding routine recognizes and changes the encoding for the third quadrant to a four-luminance encoded quadrant (10) or a 16 luminance quadrant (11), whichever yields the best results in order to eliminate the ambiguous header. If the third quadrant is a homogeneous quadrant, resulting in a block header value of 011101xx, the encoding routine changes the encoding for the third quadrant to a four-luminance quadrant (10).

Although only a single illustrative embodiment has been described in detail herein, other embodiments, changes and modifications will become immediately apparent to those skilled in the art. Accordingly, it is the object of the appended claims to cover all such variations and modifications as come within the true spirit and scope of the invention.

What is claimed is:

1. An image processing system for compressing a digital data stream comprising a sequential series of data blocks, each of said data blocks having a beginning and representing a portion of a digitized video image which is displayed as a succession of multi-block frames, the image processing system comprising:

a frame buffer store responsive to the digital data stream for storing a plurality of sequential data blocks representing an entire frame of the digitized video image;

apparatus responsive to digital data in each of the sequential data blocks for compressing the digital data in each data block using one of a plurality of compression techniques;

a comparator mechanism responsive to the stored data blocks and to the digital data stream for inserting into the digital data stream an escape code which indicates a common compression characteristic shared by a plurality of digital data blocks following the escape code; and apparatus responsive to the one of the plurality of compression techniques and to the escape code for inserting a header code at a beginning of each data block, which header code when taken together with a preceding escape code indicates the one of the plurality of compression techniques used.

2. An image processing system according to claim 1 wherein the comparator mechanism is responsive to the stored data blocks for inserting a first escape code into the data stream, the first escape code indicating the existence of a number of sequential data blocks following the escape code that are unchanged from one video frame to a succeeding video frame.

3. An image processing system according to claim 2 wherein the comparator mechanism is responsive to the stored data blocks for inserting a run code into the data stream following the first escape code, the run code indicating the number of unchanged blocks.

4. An image processing system according to claim 1 wherein the comparator mechanism is responsive to the stored data blocks for inserting a second escape code into the data stream, the second escape code indicating that succeeding data blocks are not compressed until a further second escape code is inserted into the data stream.

5. An image processing system according to claim 1 wherein each of the plurality of data blocks is divided into a plurality of sub-blocks and wherein the header code associated with each data block comprises a sub header code for each of the plurality of sub-blocks, which sub-header code, when taken together with a preceding escape code indicates the one of the plurality of compression techniques used to encode each of the plurality of sub-blocks.

6. An image processing system according to claim 5 wherein each of the plurality of data blocks is divided into four quadrants and each of the plurality of sub-blocks equals one quadrant.

7. An image processing system according to claim 1 wherein the header code insertion apparatus inserts one of a plurality of header codes at the beginning of each data block and wherein the escape codes comprise selected ones of the plurality of header codes.

8. An image processing system according to claim 7 wherein the selected ones of the plurality of header codes comprise header codes which are unlikely to occur during compression of the data stream.

9. An image processing system for decompressing a digital data stream comprising a sequential series of data blocks with interspersed escape codes, each of said data blocks having a beginning with a header code located at the data block beginning, the data block representing a portion of a digitized video image which is displayed as a succession of multi-block frames, the image processing system comprising:

a frame buffer store responsive to the digital data stream for storing a plurality of sequential data blocks representing an entire frame of the digitized video image;

a detector mechanism responsive to the stored data blocks and to the digital data stream for detecting an escape code in the digital data stream which indicates a common compression characteristic shared by a plurality of the digital data blocks following the escape code;

apparatus responsive to digital data in each of the image blocks for decompressing the digital data in each data block using a selected one of a plurality of decompression techniques; and apparatus responsive to the escape code and to the header code at the beginning of each data block for selecting one of the plurality of decompression techniques.

10. An image processing system according to claim 9 wherein the detector mechanism is responsive to a first escape code in the data stream, the first escape code indicating the existence of a number of sequential data blocks following the escape code that are unchanged from one video frame to a succeeding video frame and, the first escape code also causing the detector mechanism to retrieve the number of data blocks from the frame buffer store.

11. An image processing system according to claim 10 wherein the detector mechanism is responsive to the first escape code for detecting a run code in the data stream following the first escape code in order to determine the number of unchanged blocks.

12. An image processing system according to claim 9 wherein the detector mechanism is responsive to a second escape code in the data stream for discontinuing decompression until a further second escape code is detected in the data stream.

13. An image processing system according to claim 9 wherein each of the plurality of data blocks is divided into a plurality of sub-blocks and wherein the header code associated with each data block comprises a sub header code for each of the plurality of sub-blocks and wherein the selecting apparatus is responsive to both the sub header codes and to a preceding escape code for selecting one of the plurality of decompression techniques to decode each of the plurality of sub-blocks.

14. An image processing system according to claim 13 wherein each of the plurality of data blocks is divided into four quadrants and each of the plurality of sub-blocks equals one quadrant.

15. An image processing system according to claim 9 wherein the escape codes comprise selected ones of the plurality of header codes.

16. An image processing system according to claim 15 wherein the selected ones of the plurality of header codes comprise header codes which are unlikely to occur during decompression of the data stream.

17. An image processing system wherein a digital data stream comprising a sequential series of data blocks, each of said data blocks having a beginning and representing a portion of a digitized video image is displayed as a succession of multi-block frames, the image processing system comprising:

a first frame buffer store responsive to the digital data stream for storing a plurality of sequential data blocks representing an entire frame of the digitized video image;

apparatus responsive to digital data in each of the data blocks for compressing the digital data in each data block using one of a plurality of compression techniques;

a comparator mechanism responsive to the stored data blocks and to the digital data stream for inserting into the digital data stream an escape code which indicates a common compression characteristic shared by a plurality of digital data blocks following the escape code;

apparatus responsive to the one of the plurality of compression techniques and to the escape code for inserting a header code at a beginning of each data block, which header code when taken together with a preceding escape code indicates the one of the plurality of compression techniques used;

apparatus for providing the data stream to a utilization device;

a detector mechanism in the utilization device for detecting an escape code in the digital data stream;

apparatus responsive to digital data in each of the image blocks for decompressing the digital data in each data block using a selected one of a plurality of decompression techniques; and apparatus responsive to the escape code and to the header code at the beginning of each data block for determining the compression technique used to compress the data stream and selecting one of the plurality of decompression techniques.

18. An image processing system according to claim 17 wherein each of the plurality of data blocks is divided into a plurality of sub-blocks and wherein the header code associated with each data block comprises a sub header code for each of the plurality of sub-blocks and the determining apparatus is responsive to both the sub header codes and to a preceding escape code for selecting one of the plurality of decompression techniques to decode each of the plurality of sub-blocks.

19. An image processing system according to claim 18 wherein each of the plurality of data blocks is divided into four quadrants and each of the plurality of sub-blocks equals one quadrant.

20. An image processing system according to claim 19 wherein the escape codes comprise selected ones of the plurality of header codes.

21. A method for compressing a digital data stream comprising a sequential series of data blocks, each of said data blocks having a beginning and representing a portion of a digitized video image which is displayed as a succession of multi-block frames, the image processing system, the method comprising the steps of:

A. storing a plurality of sequential data blocks representing an entire frame of the digitized video image in a frame buffer store;

B. compressing the digital data in each data block using one of a plurality of compression techniques;

C. inserting into the digital data stream an escape code which indicates a common compression characteristic shared by a plurality of digital data blocks following the escape code; and D. based on the escape code inserted into the data stream in step C, inserting a header code at a beginning of each data block, which header code when taken together with a preceding escape code indicates the one of the plurality of compression techniques used in step B.

22. A method according to claim 21 wherein step C further comprises the step of:

C1. inserting a first escape code into the data stream to indicate the existence of a number of sequential data blocks following the escape code that are unchanged from one video frame to a succeeding video frame.

23. A method according to claim 22 wherein step C further comprises the step of:

C2. inserting a run code into the data stream following the first escape code, the run code indicating the number of unchanged blocks.

24. A method according to claim 21 wherein step C further comprises the step of:

C3. inserting a second escape code into the data stream, the second escape code indicating that succeeding data blocks are not compressed until a further second escape code is inserted into the data stream.

25. A method according to claim 21 wherein step B comprises the step of:

B1. dividing each of the plurality of data blocks into a plurality of sub-blocks and compressing each sub-block.

26. A method according to claim 25 wherein step D comprises the step of:

D1. dividing the header code associated with each data block into a sub header code for each of the plurality of sub-blocks, which sub-header code, when taken together with a preceding escape code indicates the one of the plurality of compression techniques used to encode each of the plurality of sub-blocks.

27. A method according to claim 26 wherein step D1 comprises the step of:

D1A. dividing each of the plurality of data blocks into four quadrants where each of the plurality of sub-blocks equals one quadrant.

28. A method according to claim 27 wherein step C comprises the steps of:

C4. selecting a header code from a plurality of header codes; and

C5. selecting an escape code from the plurality of header codes.

29. A method for decompressing a digital data stream comprising a sequential series of data blocks with interspersed escape codes, each of said data blocks having a beginning with a header code located at the data block beginning, the data block representing a portion of a digitized video image which is displayed as a succession of multi-block frames, the method comprising the steps of:

A. storing a plurality of sequential data blocks representing an entire frame of the digitized video image in a frame buffer store;

B. detecting an escape code in the digital data stream which indicates a common compression characteristic shared by a plurality of the digital data blocks following the escape code;

C. decompressing the digital data in each data block using a selected one of a plurality of decompression techniques; and D. selecting one of the plurality of decompression techniques based on the escape code and the header code at the beginning of each data block.

30. A computer program product for use with a graphics display device, said computer program product comprising:

a computer usable medium having computer readable program code means embodied in said medium for compressing a digital data stream having a sequential series of data blocks, each of said data blocks having a beginning and representing a portion of a digitized video image which is displayed as a succession of multi-block frames, the computer program product comprising:

a means for causing a computer to store a plurality of sequential data blocks representing an entire frame of the digitized video image in a frame buffer store;

a means for compressing the digitized data in each data block using one of a plurality of compression techniques;

a means for inserting an escape code into the digital data stream, the escape code indicating a common compression characteristic shared by a plurality of digital data blocks following the escape code; and based upon the escape code inserted into the data stream, a means for inserting a header code at the beginning of each data block, which header code when taken together with a preceding escape code indicates one of the plurality of compression techniques used by the data compressor.

31. The computer program product as defined in claim 30 further comprising a means for inserting a first escape code into the data stream indicating that a number of sequential data blocks following the escape code are unchanged from one video frame to a succeeding video frame.

32. A computer program product comprising:

a computer usable medium having computer readable program code means embodied in said medium for decompressing a digital data stream having a sequential series of data blocks with interspersed escape codes, each of the data blocks having a beginning with a header code located at the data block beginning, the data block representing a portion of a digitized video image which is displayed as a succession of multi-block frames, the computer program product comprising:

a means for causing a computer to store a plurality of sequential data blocks representing an entire frame of the digitized video image in a frame buffer store;

a means for detecting an escape code in the digital data stream which indicates a common compression characteristic shared by a plurality of the digital data blocks following the escape code;

a means for selecting one of a plurality of decompression techniques based upon the escape code and the header code at the beginning of each data block; and a means for decompressing the digital data in each data block using a selected one of a plurality of decompression techniques.

33. The computer program product as defined in claim 32 wherein the detecting means is responsive to a first escape code in the data stream indicating that a number of sequential data blocks following the escape code are unchanged from one video frame to a succeeding video frame for retrieving the number of data blocks from the frame buffer store.

* * * * *

UNITED STATES PATENT AND TRADEMARK OFFICE
CERTIFICATE OF CORRECTION

PATENT NO. : 6,195,391 B1
DATED : February 27, 2001
INVENTOR(S) : Hancock et al.

It is certified that error appears in the above-identified patent and that said Letters Patent is hereby corrected as shown below:

Title page,
The title should read: -- HYBRID SYSTEM FOR COMPRESSING/ DECOMPRESSING A VIDEO DATA STREAM --

Signed and Sealed this

Twenty-fifth Day of December, 2001

Attest:

*Attesting Officer*

JAMES E. ROGAN
*Director of the United States Patent and Trademark Office*